US010102305B1

United States Patent
Chang et al.

(10) Patent No.: US 10,102,305 B1
(45) Date of Patent: Oct. 16, 2018

(54) TRENDING OF CONTENT ITEMS BASED ON CURRENT INTERACTIONS BY TOP COLLABORATORS

(71) Applicant: Dropbox, Inc., San Francisco, CA (US)

(72) Inventors: Tsung-Hsiang Chang, San Bruno, CA (US); Neil Sethi, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 77 days.

(21) Appl. No.: 15/590,812

(22) Filed: May 9, 2017

(51) Int. Cl.
| G06F 17/30 | (2006.01) |
| H04L 12/26 | (2006.01) |
| H04L 29/08 | (2006.01) |
| G06Q 30/02 | (2012.01) |
| G06F 3/048 | (2013.01) |

(52) U.S. Cl.
CPC .. *G06F 17/30899* (2013.01); *G06F 17/30625* (2013.01); *G06F 17/30873* (2013.01); *G06F 17/30902* (2013.01); *H04L 29/08099* (2013.01); *H04L 43/045* (2013.01); *G06F 3/048* (2013.01); *G06Q 30/02* (2013.01); *H04L 29/08* (2013.01)

(58) Field of Classification Search
CPC ......... G06F 17/30899; G06F 17/30902; G06F 17/30625; G06F 17/30873; G06F 3/048; H04L 29/08099; H04L 43/045; H04L 29/08; G06Q 30/02
USPC .......................................................... 715/738
See application file for complete search history.

(56) References Cited

U.S. PATENT DOCUMENTS

| 9,235,312 B2 | 1/2016 | Dura et al. | |
| 2012/0192086 A1* | 7/2012 | Ghods | G06Q 10/10 715/753 |
| 2013/0325948 A1* | 12/2013 | Chen | G06Q 50/01 709/204 |
| 2014/0012836 A1* | 1/2014 | Bercovici | G06F 17/30554 707/722 |
| 2014/0298207 A1 | 10/2014 | Ittah et al. | |
| 2015/0100538 A1* | 4/2015 | Chung | G06Q 10/101 706/52 |
| 2015/0220531 A1* | 8/2015 | Helvik | G06F 17/3053 707/749 |
| 2016/0070764 A1* | 3/2016 | Helvik | G06Q 10/10 707/734 |
| 2016/0171090 A1* | 6/2016 | Schwartz | G06Q 10/101 707/730 |
| 2016/0203510 A1* | 7/2016 | Pregueiro | G06Q 30/0255 705/14.45 |

(Continued)

*Primary Examiner* — John T Repsher, III
(74) *Attorney, Agent, or Firm* — Hickman Palermo Becker Bingham LLP; Adam C. Stone

(57) ABSTRACT

An automated system and method for presenting trending content items to a user in a graphical user interface. The system and method generates trend scores of content items for a user based on current interactions with the content items by top collaborators of the user. By accounting for trends in the form of current content item interactions by collaborators, the system and method determines which content items are both currently relevant to a given user and currently trending among the user's collaborators. The system and method presents content items determined to be trending for a user in a graphical user interface presented to the user. The system and method system improve computers for information discovery by enabling users to spend less time searching for content items.

20 Claims, 8 Drawing Sheets

(56) References Cited

U.S. PATENT DOCUMENTS

2016/0300141 A1 10/2016 Veeraragavan et al.
2016/0371258 A1 12/2016 Gan et al.

* cited by examiner

TRENDING OF CONTENT ITEMS BASED ON CURRENT INTERACTIONS BY TOP COLLABORATORS

TECHNICAL FIELD

The present disclosure relates to online content collaboration computing systems and, more particularly, to trending of content items based on current interactions by top collaborators with a user.

BACKGROUND

Users of online content collaboration computing systems use such systems to interact (e.g., create, edit, view, share, comment on, etc.) with many electronic documents and other information such as, for example, electronic communications, messages, images, data, etc. For example, an employee of a company may interact with hundreds or thousands of content items. Each of these content items may have varying degrees of relevance, interest, or importance to the employee. One technique that a user may employ to locate content items of relevance, interest, or importance is to search for them using a keyword-based search engine. Unfortunately, this can be time consuming and inefficient. Additionally, the user may not be aware of content items per trends such as, for example, collaborators of the user that are currently interacting with content items online.

BRIEF DESCRIPTION OF THE DRAWINGS

The accompanying drawings illustrate various examples of this disclosure. In the drawings.

DETAILED DESCRIPTION

The present disclosure is directed to an automated system and method for presenting trending content items to a user in a graphical user interface. Examples of the trending content items system generate trend scores of content items for a user based on current interactions with the content items by top collaborators with the user. The content items may include, but are not limited to, electronic documents, electronic communications, electronic messages, digital images, digital videos, digital audio, etc.

By accounting for trends in the form of current content item interactions by top collaborators, the trending content items system computes trend scores of content items, and determines which content items are both currently relevant to a given user and currently trending among the user's top collaborators. The trending content items system presents content items determined to be trending in a graphical user interface. Thus, the trending content items system improves user efficiency by enabling users to spend less time searching for content items.

Example Trending Content Items Presentation

Trending content items may be presented to a user in a graphical user interface. As explained in greater detail below, the trending content items may be determined by generating trend scores for the content items based on current interactions with the content items by top collaborators of the user.

Figure 1:
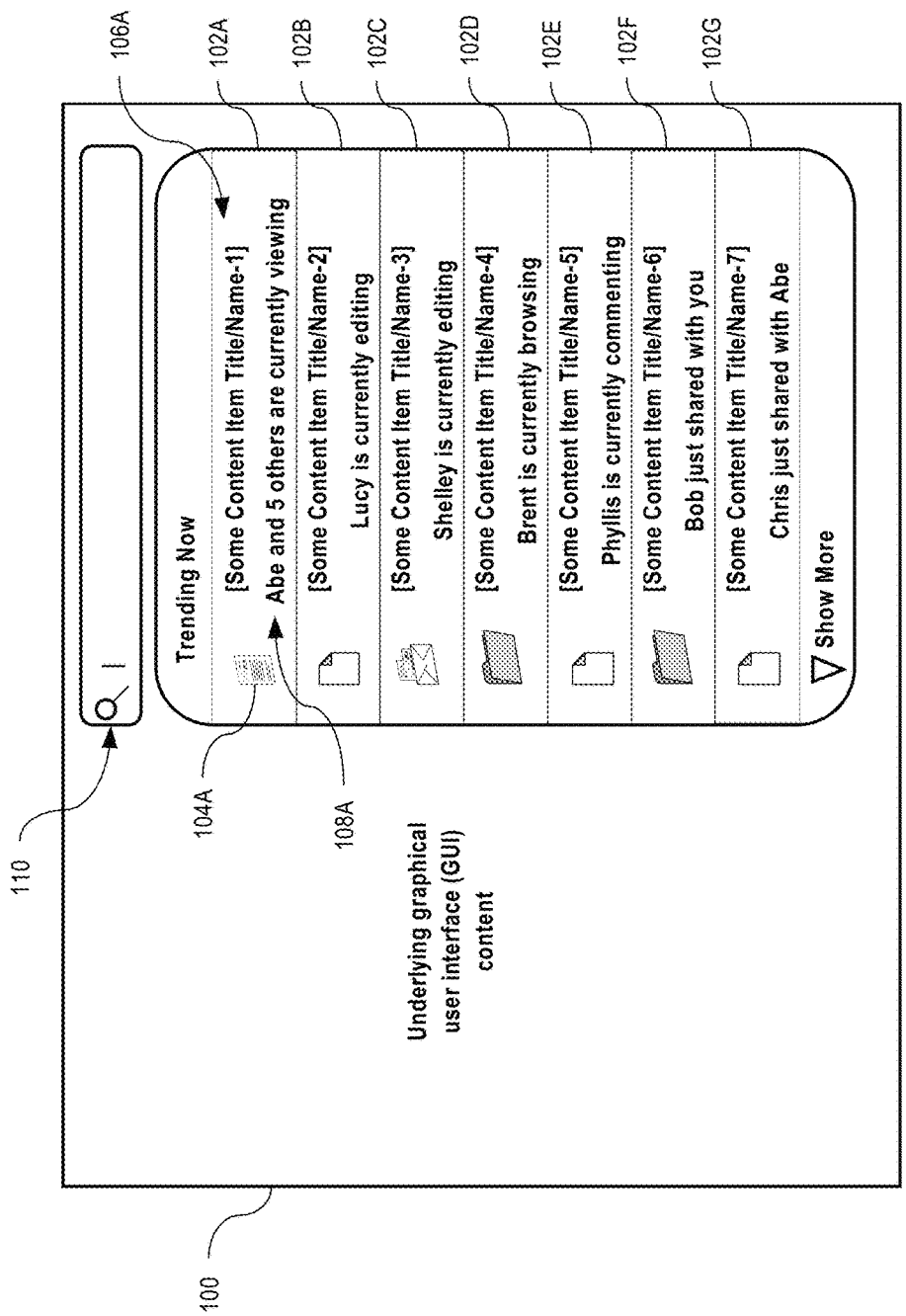
FIG. 1 illustrates an example trending content items presentation.

FIG. 1 is an illustration of an example trending content items presentation graphical user interface 100 presented to a user. As illustrated in FIG. 1, several different "trending" content items 102A-G are visually represented in the graphical user interface 100. The content items 102 may include, for example, electronic documents, e-mail messages or other electronic messages, digital images, digital videos, digital audio files, or other content items. The graphical user interface 100 may be displayed in a video display or other electronic display of a computing device. The computing device can be any computing device having or being operatively coupled to a video display such as, for example, a desktop computer, a workstation computer, a tablet computer, a handle computer, a mobile computer (e.g., a mobile smart phone), or the like.

The trending content items 102 illustrated in the graphical user interface 100 are graphical representations of the content items determined to be trending for the user based on current interactions with the content items by top collaborators of the user. The trending content items 102 may be provided by software instructions for generating the graphical user interface 100 and for displaying the trending content items 102 in the graphical user interface 100, as illustrated in FIG. 1. The trending content items 102 may be accessed from a variety of different access points including, but not limited to, a stand-alone application such a desktop or mobile application, a web browser application, or other application suitable for accessing and displaying the trending content items 102 (e.g., a word processing application, a spreadsheet application, an e-mail application, a social networking application, a text message application, etc.).

Trending content items (e.g., 102) may be displayed in a graphical user interface (e.g., 100) as a list items. Each list item may comprise one or more of:

a thumbnail icon or thumbnail preview (e.g., 104A) that visually aides the user in understanding the type of the content item (e.g., document, e-mail message, content item folder, content item collection, video, image, audio, etc.), a title or name given to the content item (e.g., 106A), and/or current collaborator interaction information (e.g., 108A) that provides a description, synopsis, or summary of the current interactions with the content item to aid the user in understanding why the content item is trending for the user.

As used herein, the term "and/or" the term "and/or" refers to and encompasses all possible combinations of one or more of the associated listed items. The terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Returning to FIG. 1, a list item for a trending content item (e.g., 102A) may be interactive as a selectable hyperlink that the user can activate with user input to access the content item (e.g., view a preview of the content item, open the content item, download the content item, etc.) or navigate to a page concerning or associated with the content item.

Trending content items (e.g., 102) may be presented in a graphical user interface (e.g., 100) in response to the user placing user input focus in a keyword search bar (e.g., 110) or other text input field for entering keywords of a search query for searching for content items. For example, the trending content items 102 may be presented in graphical user interface 100 in response to the user using a pointing device (e.g., a mouse) or the user performing a touch gesture on a touch-sensitive surface (e.g., a touch-screen display) to set the user input focus to search bar 110.

Trending content items (e.g., 102) may be presented in a graphical user interface (e.g., 100) before the user begins entering characters of search query keywords into a search bar (e.g., 110). By doing so, the user may notice or discover a trending content item (e.g., 102A) that is relevant, important, or interesting to the user without the user having to search for the content item by entering a keyword search query.

While trending content items (e.g., 102) may be presented to a user in a graphical user interface (e.g., 100) in response to the user placing user input focus in a keyword search bar (e.g., 110), trending content items (e.g., 102) are not limited to being presented only in that situation. Trending content items (e.g., 102) may be presented to a user in a graphical user interface in other situations such as, for example, on a home page or other page of a web site presented to the user, in an e-mail message or text message sent to the user, or in the user's social networking news feed.

Trending of Content Items Based on Current Interactions by Top Collaborators

The graphical user interface 100 includes one or more trending content items 102 that are determined to be trending among top collaborators of the user as determined by a trend scoring system. The trend scoring system is operable to determine trend scores for content items based on current interactions with the content items by top collaborators with a user.

Figure 2:
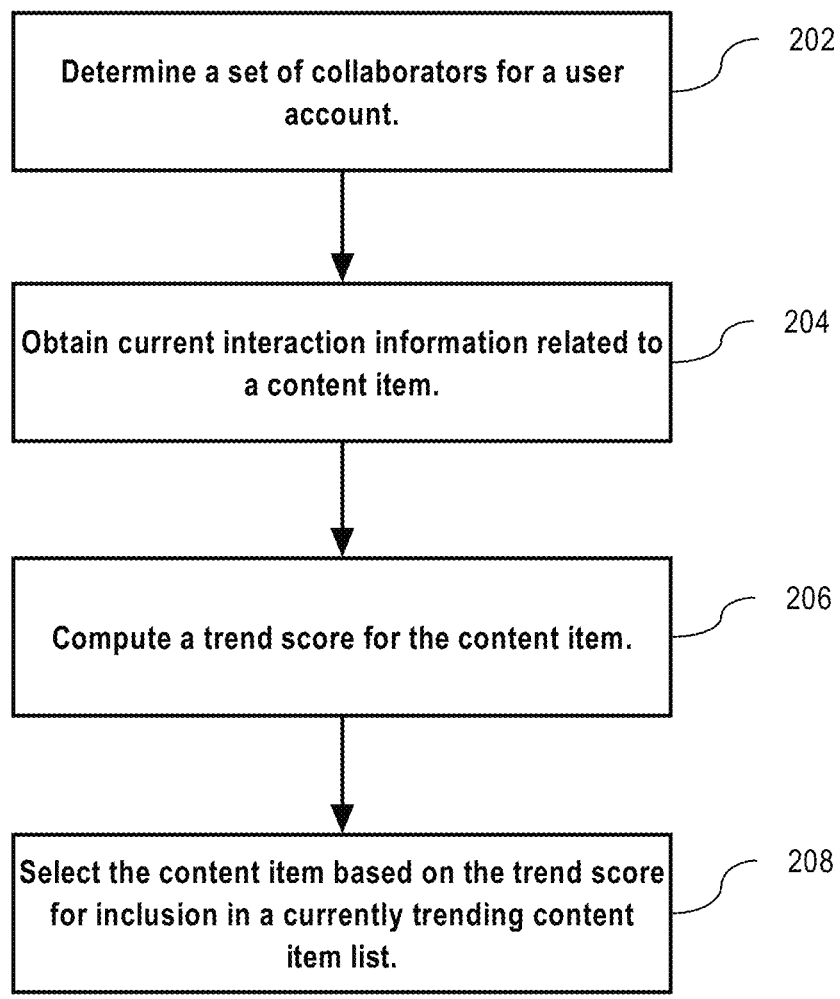
FIG. 2 is a flow diagram of a process for trending of content items based on current interactions by top collaborators with a user.

FIG. 2 is a flow diagram of a high-level process 200 for trending of content items based on current interactions by top collaborators. The process 200 may be performed by a computing system comprising one or more processors and memory storing one or more computer programs for execution by the one or more processors, where the one or more computer programs include instructions configured for performing the process 200 when executed by the one or more processors. The one or more processors and memory of the computing system may be provided by one or more hardware machines such as example hardware machine 700 described below and illustrated in FIG. 7. In addition to instructions for performing some or all the operations of the process 200, each of the hardware machines may be configured with a software system like software system 800 described below and illustrated in FIG. 8.

Determining Top Collaborators

At operation 202, a set of top collaborators with a user account (e.g., stored in user account database 516, or the like) of a content management system (e.g., content management system 300, collaborative content management system 330, or the like) is determined. The set of top collaborators may be determined based on a collaboration score (which may be composed of a single value or multiple values) computed for each collaborator in the set of top collaborators.

The collaboration score determined for a collaborator and a user account may be based on one or more collaboration events in the content management between the user account and the collaborator. The set of top collaborators with the user account may be determined from among a superset of collaborators with the user account for which collaboration scores are computed. For example, the top/best-N scoring collaborators from the superset may be selected as the set of top collaborators with the user account. The number N may be predetermined such that at most the N top/best collaborators are selected for inclusion in the set of top collaborators with the user account. Alternatively, the number N may result from selecting, for inclusion in the set of top collaborators with the user account, all collaborators from the superset having a collaboration score above a threshold. As still yet another alternative, the set of top collaborators with the user account may be determined as all collaborators (e.g., the superset) with the user account.

Operation 202 may be performed periodically (e.g., once a day) to update the set of top collaborators with the user account based on more recent collaboration events (e.g., to account for collaboration events that have occurred in the past 24 hours).

A collaborator is a user of the content management system holding a user account with the content management system that participates in one or more collaboration events with one or more other collaborators. A collaboration event occurs when collaborators interact with the same content item or with each other using an application (e.g., client application 400, collaborative content item editor 470, web browser 460, or the like) with the content management system. Such interaction may include, for example, viewing the content item, editing the content item, sharing the content item, commenting on the content item, liking or favorite-ing the content item, downloading the content item, or other action that may be performed with respect to a content item using an application of the content management system.

The content management system may record interaction events as they occur in an "interaction" log. For example, each time a user interacts with a content item using an application of the content management system, the content management system may store an entry in the interaction log that contains information about the interaction. Such information may include an identifier of the user that interacted with the content item, an identifier of the content item, the date and/or time of the interaction, and the type of interaction (e.g., view, edit, download, comment on, share, like, favorite, etc.). The content management system may data mine or otherwise process records in the interaction log to determine occurrences of collaboration events and to compute metrics and instance counts thereof. A collaboration event may be identified based on records in the interaction log involving the same content item and/or the same users. Large-scale data analytic techniques using a MapReduce system or other large-scale data processing system may be used to determine collaboration events, metrics, and instance counts at a large data scale based on records in an interaction log which may contain many gigabytes, terabytes, or more of data.

The occurrence of a collaboration event between a user account and a collaborator may be determined based on identifying a record or records in the interaction log indicating any of the following collaboration events:

User Account Shares—The user account shared a content item with the collaborator (e.g., via client application 400, collaborative content item editor 470, or web browser 460 and sharing module 510), Collaborator Shares—The collaborator shared a content item with the user account (e.g., via client application 400, collaborative content item editor 470, or web browser 460 and sharing module 510), Third-Party Shares—another collaborator shared a content item with both the user account and the collaborator (e.g., via client application 400, collaborative content item editor 470, or web browser 460 and sharing module 510), View—The user account and the collaborator viewed the same content item (e.g., via client application 400, collaborative content item editor 470, or web browser 460 and user interface module 502 or collaborative content item editor module 604), Edit—The user account and the collaborator edited the same content item (e.g., via client application 400, collaborative content item editor 470, or web browser 460 and user interface module 502 or collaborative content item editor module 604), Comment—The user account and the collaborator commented on the same content item (e.g., via client application 400, collaborative content item editor 470, or web browser 460 and user interface module 502 or collaborative content item editor module 604), Download—The user account and the collaborator downloaded the same content item (e.g., via client application 400, collaborative content item editor 470, or web browser 460 and user interface module 502 or collaborative content item editor module 604), Favorite/Like—The user account and the collaborator favorited or liked the same content item (e.g., via client application 400, collaborative content item editor 470, or web browser 460 and user interface module 502 or collaborative content item editor module 604)

Metrics, aggregations, and instance counts may be determined based on determined collaboration events. Collaboration event instance counts are determined for each collaborator of collaborators of a given user account based on various collaboration events involving the user account and the collaborator. The instance counts may be stored in association with the given user account and the collaborator for which the instance counts are determined. The collaboration events that are included in an instance count may be limited to those that occurred within a specified time such as, for example, the past 24 hours, the past week, the past month, or another predetermined time. However, all known collaboration events between the user account and the collaborator may be included.

One or more instances of a user account sharing a content item with a collaborator may be counted. Each count can be weighted based on the recency of the collaboration event. For example, determining (1) a first collaboration event in which user account Alice shares content item $CI_1$ with collaborator Bob and determining (2) a second collaboration event in which user account Alice shares content item $CI_2$ with collaborator Bob may be counted as two instances of the User Account Shares collaboration event between user account Alice and collaborator Bob. Content items $CI_1$ and $CI_2$ may be the same or different content items.

One or more instances of a collaborator sharing a content item with a user account may be counted. Each count may be weighted based on the recency of the collaboration event. For example, determining (1) a first collaboration event in which collaborator Bob shares content item $CI_1$ with user account Alice and determining (2) a second collaboration event in which collaborator Bob shares content item $CI_2$ with user account Alice may be counted as two instances of the Collaborator Shares collaboration event between user account Alice and collaborator Bob. Here, content items $CI_1$ and $CI_2$ may be the same or different content items.

One or more instances of a collaborator sharing a content item with both a user account and a collaborator may be counted. Each count may be weighted based on the recency of the collaboration event. For example, determining a first collaboration event in which a collaborator Chris shares a content item $CI_1$ with both user account Alice and collaborator Bob and a second collaboration event in which user Doug shares content item $CI_2$ with both user account Alice and collaborator Bob may be counted as two instances of the Third-Party Shares collaboration event between user account Alice and collaborator Bob. Content items $CI_1$ and $CI_2$ can be the same or different content items. These collaboration events may also be counted as two instances if the same collaborator (e.g., Chris or Doug) shared the content item in both events, as opposed to different collaborators as in the example above.

Instance counts may be computed for other types of collaboration events. One or more instances of a user account viewing, editing, download, commenting on, or favorite-ing/liking the same content item as a collaborator are counted. Each count may be weighted based on the recency of the collaboration event. For example, determining (1) a first collaboration event in which both collaborator Bob and user account Alice views, edit, download, comment on, or favorite/like a content item $CI_1$ and determining (2) a second collaboration event in which both collaborator Bob and user account Alice views, edit, download, comment on, or favorite/like content item $CI_2$ may be counted as two instances of a View, Edit, Download, Comment, or Favorite/Like collaboration Event, respectively. Content items $CI_1$ and $CI_2$ can be the same or different content items.

Each instance of a collaboration event may be counted as one instance for purposes of the instance count. However, an instance of a collaboration event may count as a value between 0 and 1 exclusive in another embodiment. In other words, an instance of a collaboration event may be weighted for purposes of the instance count. One way an instance of a collaboration event may be weighted is based on how recently the collaboration event occurred. For example, an instance of collaboration event that occurred more recently relative a reference time may have an instance count closer to one while an instance of a collaboration event that occurred less recently relative to the reference time has an instance count closer to zero. The reference time may be based on a current time or may be determined based on the time of occurrence of a recent collaboration event. The reference collaboration event providing the reference time may or may not be the same type of collaboration event as the collaboration event being weighted based on the reference time. For example, the reference collaboration event may be the most recent collaboration event among all collaboration events between the user account and the collaborator. The instance count weight given to a collaboration event can based on the time distance between the reference time and the time of occurrence of the collaboration event with shorter time distances resulting in a higher instance count weight (e.g., an instance count of one or closer to one) and longer time distances resulting in a lower instance count weight (e.g., an instance count of zero or closer to zero).

A collaboration score for a collaborator and a user account may be computed as the sum of a weighted and normalized component collaboration scores, where each component collaboration score of the sum corresponds to a different type or different types of collaboration events. More formally, a collaboration score for a collaborator and a user account may be computed per the following formula:

$$\text{collaboration score}_{c,u} = \sum_{t=1}^{n} w_t * \text{normalize}(\text{component collaboration score}_{c,u,t})$$

As shown above, a collaboration score for a given collaborator c and a given user account u may be computed as the sum of n number of weighted and normalized component collaboration scores for the given collaborator c, the given user account u, and a set t of one or more types of collaboration events. The weight $w_t$ applied to the normalized component collaboration score for the given collaborator c, the given user account u, and the set t of one or more types of collaboration events may vary based on the types of collaboration events in the set t to reflect that some types of collaboration events should receive more weight in the collaboration score that other types of collaboration events.

The weights $W_{t \in (1 \ldots n)}$ may be predefined. Alternatively, the weights may be learned using machine learning techniques (e.g., a neural network). In the machine learning case, the weights may be learned using a supervised learning approach based on a training set where the labels in the training set are based on user click through data. The user click through data may reflect which content items presented a trending content items list (e.g., 102 of FIG. 1) that the user clicked on or otherwise interacted with (e.g., selected).

As indicated above, a component collaboration score for the given collaborator c, the given user account u, and a set t of one or more types of collaboration events (component collaboration score$_{c,u,t}$) may be computed as a count of collaboration events where each such collaboration event is between the given collaborator c and the given user account u and is one of the collaboration event types in set t. For example, a component collaboration score for the given collaborator c, the given user account u, and the set t of collaboration event types that consists of the View and Edit collaboration event types may be computed be counting the number of collaboration events between the given collaborator c and the given user account u that are of collaboration event type View or Edit.

Also, as indicated above, a component collaboration score for the given collaborator c, the given user account u, and a set t of one or more types of collaboration events (component collaboration score$_{c,u,t}$) may assign less weight to relatively older collaboration events. For example, a component collaboration score for the given collaborator c, the given user account u, and the set t of collaboration event types that consists of the User Shares collaboration event may be computed per the following formula:

$$\text{component collaboration score}_{c,u,\{UserShares\}} = \sum_{e=1}^{m} \alpha^{\log(\text{time distance}_e)}$$

Here, given a set of User Shares collaboration events ($e_1$, $e_2$, . . . , $e_m$) between the given collaborator c and the given user account u, the component collaboration score is computed as the sum of weighted values computed for the set of User Shares collaboration events. The weights are based on the recency of the collaboration events such that less recent User Shares collaboration events in the set ($e_1$, $e_2$, . . . , $e_m$) compose a smaller portion of the overall component collaboration score than more recent User Shares collaboration events in the set ($e_1$, $e_2$, . . . , $e_m$). Recency of a User Shares collaboration event may be measured in terms of a time distance between a current date/time and a date/time of the User Shares collaboration event. For example, the time distance (time distance$_e$) for a given collaboration event e may be computed as the number of days between a current day and a day of occurrence of the collaboration event and adding one so that time distance is not zero when the current day and the day of occurrence of the collaboration event is the same day. Instead of the number of days, the time distance can be based on other time units such as the number of minutes or seconds. The base a of the exponentiation can be a predefined value between 0 and 1 exclusive. The base a may be selected per the requirements of the implementation at hand including how older collaboration events should be weighted as compared to more recent collaboration events. In an example implementation, the base a is approximately 0.2.

Obtaining Current Interaction Information

At operation 204, current interaction information related to a content item is obtained. The current interaction information reflects current interactions by users with the content item. The users interacting with the content item may include one or more of the collaborators determined in operation 202. The current interaction information may be obtained in the form of an interaction event data item (or just "interaction event") representing an instance of an interaction. The interaction event may include such current interaction information as: (a) an identifier of the user that conducted the interaction, (b) an identifier of the content item that was interacted with, (c) an identifier of the type of interaction that the user conducted, and/or (d) a date/time indicating when the interaction occurred.

As used herein in the context of interacting with a content item, the term "current" refers to a time of occurrence of the interaction with the content item being after a start time of a sliding time window having a fixed or variable time window size. The occurrence time may be based on the time of a various events pertaining to the interaction such as a time when the interaction is detected, a time when the interaction is performed by the user, a time when an interaction event for the interaction is obtained, or a time when an interaction event for the interaction is logged or otherwise stored in computer memory (volatile or non-volatile) for future processing. The start time of the time window may advance on a regular interval by the interval amount. As such, old interaction events that were within time window before the advance are no longer in the window after the advance. As an example, consider a time window with a fixed window size of twenty minutes comprising current three interaction events $IE_1$, $IE_2$, and $IE_3$ where the occurrence time of interaction event $IE_1$ is one minute after the current start time of the time window, interaction event $IE_2$ is five minutes after the current start time of the time window, and interaction event $IE_3$ is ten minutes after the current start time of the current time window. If the start time of the time window is advanced one minute every minute, then after the current start time of the time window is advanced by one minute, then interaction event $IE_1$ is no longer a current interaction event while interaction events IE₂ and IE₃ remain current interaction events. While this example involves a sliding time window with a fixed window size, it is also possible for the sliding time window to have a variable window size that is adjusted periodically based on various factors such as, for example, the rate at which interaction events are detected.

In an embodiment, a trending content items list data structure is maintained in computer memory for user accounts using an application of the content management system. When an interaction event is detected, current interaction information of the interaction event may be added to the trending content items list(s) of the user account(s) that have access to the content item that is the subject of the interaction event. Whether a given user account has access to a content item may be based on access controls associated with the content item and/or the user account. Interaction events previously added to a trending content items list that are no longer current according the current start time of the sliding time window may be removed when a new interaction event is added. Additionally or alternatively, interaction events may be removed periodically such as, for example, as part of a garbage collection process or upon advancing the current start time of the sliding time window.

Computing Trend Scores

At operation 206, trend scores for the content items in a trending content items list for a user account are computed. The trend scores may be computed based on the current interaction information related to the content items stored in the trending content items list for the user account. In an embodiment, when computing a trend score for a content item, only interaction events that are current are considered. That is, only interaction events associated with the content item in the trending content items list for the user account having an occurrence time that is after the current start time of the sliding time window are considered.

In an embodiment, to compute the trend score for a content item, each current interaction event associated with the content item in the trending content items list may be assigned a base or neutral score such as, for example, one. Each base or neutral score is then weighted based on the recency of the corresponding interaction event and the type of the interaction event. More recent interaction events receive greater weight than less recent interaction events. Certain types of interaction events receive more weight than other types of interaction events. For example, an editing interaction event may receive greater weight than a viewing interaction event.

In addition, in an embodiment, if a current interaction event is associated with a collaborator of the user account as determined in operation 202, then the computation of the trend score may be further based on the collaboration score computed for the collaborator in operation 202, with higher collaboration scores receiving greater weight than lower collaboration scores. Thus, the base or natural score for a current interaction event may be weighted based on any combination of: (a) the recency of the current interaction event, (b) the type of the current interaction event (e.g., view, edit, download, comment on, share, favorite/like, etc.), and (c) a collaboration score of the collaborator with the user account associated with the current interaction event. The trend score for a content item may be computed by summing the weighted base or neutral scores computed for the current interaction events associated with the content item in the user account's trending content items list.

As an alternative, the trend score for a content item may be computed as the sum of the collaboration scores of the current top collaborators with the content item. That is, for a given content item in the user account's trending content items list that is associated with at least one current interaction event, the trend score for the content item may be computed as the sum of collaboration scores computed for each top collaborator with the user account as determined in step 202 above that is associated with a current interaction event for the content item.

Note that in the case that the trend score for a content item associated with current interaction events in a user account's trending content items list is computed based the types of the current interaction events, the trend score can reflect weights applied to number of collaborators that are currently interacting with the content item in different ways. For example, if collaborators Bob, Charlie, and David with user account Alice are currently viewing a content item and collaborators Ellen and Frank with user account Alice are currently editing the content item, then the trend score may reflect a first weight applied to current interaction events from the three collaborators (Bob, Charlie, and David) currently viewing the content item, and a second weight, different from the first weight, applied to current interaction events from the two collaborators (Ellen and Frank) that are currently editing the content item. The first weight may be a weight assigned to the interaction event of viewing a content item while the second weight may be a higher weight assigned to the interaction event of editing a content item.

In an embodiment, trend scores are computed for content items in a user account's trending content items list in response to the content management system receiving a request from the user account via an application of the content item management system to generate or otherwise provide a graphical user interface on which the trending content item's list is displayed presented. For example, referring back to FIG. 1, trend scores may be computed in response to the user placing user input focus in the search bar 110.

At operation 208, a content item is selected for inclusion in a currently trending content items list to be presented to a user of a user account in a graphical user interface. The selection is based on the trend score computed for the content item. In an embodiment, among the trend scores computed for the user account at operation 206, the top N scoring content items per the computed trend scores are selected for inclusion in the currently trending content items list presented to the user. Here, the number N may be based on one or more currently trending content items to present to the user in the graphical user interface and may vary based on various factors such as the type of personal computing device the user is using (e.g., workstation or mobile computing) and the size of the display screen or display area for the graphical user interface in which the currently trending content items list is presented. Alternatively, N may result from selecting from among content items scores at operation 206, all content items in the user account's trending content items list having a computed trend score above a threshold.

In an embodiment, content items listed in a currently trending content items list presented to a user of a user account are listed in a sorted order where the sorted order is based entirely or at least in part on the trend scores computed for the content items. For example, the content item presented at the top of the list may have the highest trend score among the content items listed and the content item presented at the bottom of the list may have the lowest trend score among the content items listed.

In an embodiment, the currently trending content items list presented to a user of a user account is a list of search results presented to the user in response submission of search query where at least one search result is a content item that was selected for inclusion in the list of search results based at least in part on a trend score computed for the content item. For example, the trend score may be a score component of a query-independent score computed for the content item.

In an embodiment, a content item is not selected for inclusion in the currently trending content items list to be presented to the user unless at least two top collaborators of the user are currently interacting with the content item.

Content Management System

Figure 3:
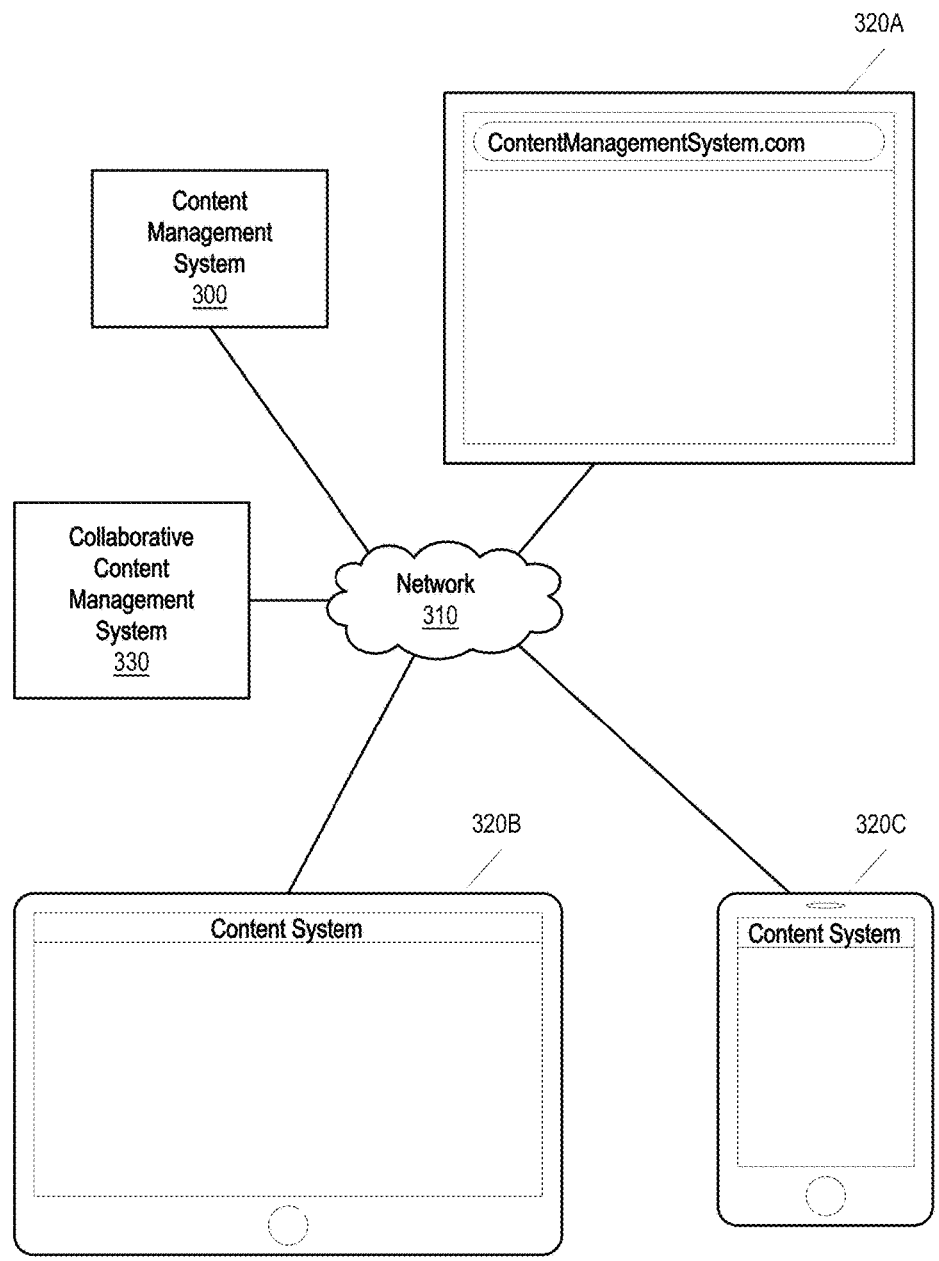
FIG. 3 illustrates a system environment including a content management system, a collaborative content management system, and client devices.

FIG. 3 shows a system environment including content management system 300, collaborative content management system 330, and client devices 320A, 320B, 320C (collectively or individually "320"). Content management system 300 provides functionality for sharing content items with one or more client devices 320 and synchronizing content items between content management system 300 and one or more client devices 320.

The content stored by content management system 300 can include any type of content items, such as documents, collaborative content items, text files, audio files, image files, video files, webpages, executable files, binary files, placeholder files that reference other content items, etc. In some embodiments, a content item can be a portion of another content item, such as an image that is included in a document. Content items can also include collections, such as folders, namespaces, playlists, albums, etc., that group other content items together. The content stored by content management system 300 may be organized in one configuration in folders, tables, or in other database structures (e.g., object oriented, key/value etc.).

In some embodiments, content stored by content management system 300 includes content items created using third party applications, e.g., word processors, video and image editors, database management systems, spreadsheet applications, code editors, and so forth, which are independent of content management system 300.

In some embodiments, content stored by content management system 300 includes content items, e.g., collaborative content items, created using a collaborative interface provided by collaborative content management system 330. In some embodiments, collaborative content items can be stored by collaborative content item management system 330, with content management system 300, or external to content management system 300. A collaborative interface can provide an interactive content item collaborative platform whereby users (e.g., one or more individuals, one or more user accounts for individuals, one or more user accounts for organizations, one or more scripts or programs, etc.) can simultaneously create and edit collaborative content items, comment in the collaborative content items, and manage tasks within the collaborative content items.

Users may create accounts at content management system 300 and store content thereon by sending such content from client device 320 to content management system 300. The content provided by users and associated with user accounts may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 320 communicate with content management system 300 and collaborative content management system 330 through network 310. The network may be any suitable communications network for data transmission. In some embodiments, network 310 is the Internet and uses standard communications technologies and/or protocols. Thus, network 310 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 310 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 310 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some embodiments, the entities use custom and/or dedicated data communications technologies instead of, or in addition to, the ones described above.

In some embodiments, content management system 300 and collaborative content management system 330 are combined into a single system. The system may include one or more servers configured to provide the functionality discussed herein for the systems 300 and 330.

Client Device

Figure 4:
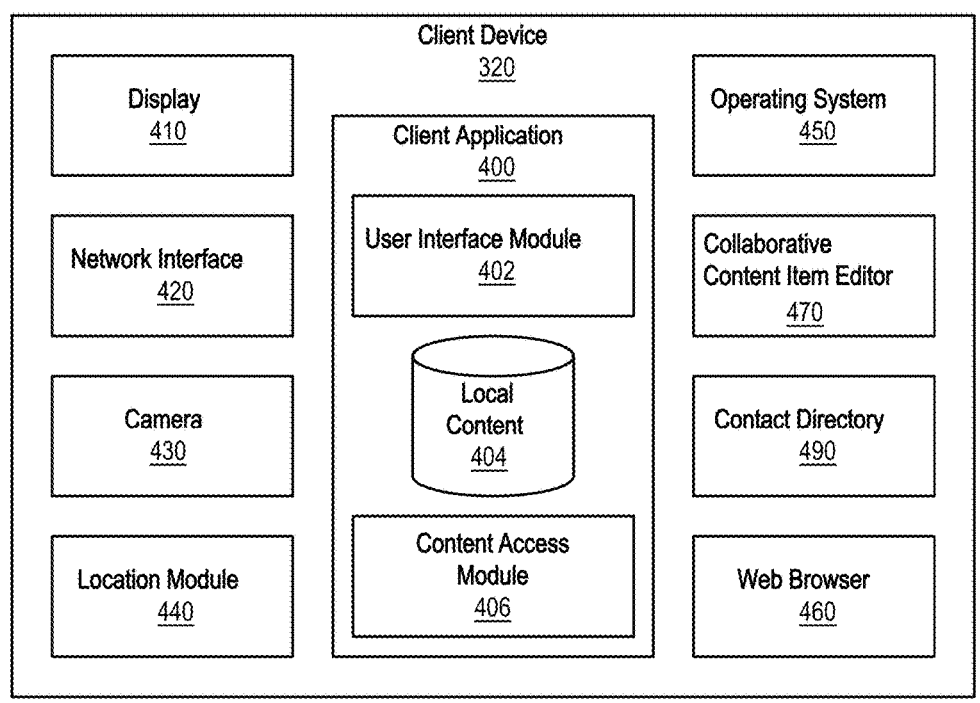
FIG. 4 illustrates a client device.

FIG. 4 shows a block diagram of the components of a client device 320 according to one embodiment. Client devices 320 generally include devices and modules for communicating with content management system 300 and a user of client device 320. Client device 320 includes display 410 for providing information to the user, and in certain client devices 320 includes a touchscreen. Client device 320 also includes network interface 420 for communicating with content management system 300 via network 310. Other components of a client device 320 that are not material are not shown, for example, one or more computer processors, local fixed memory (RAM and ROM), as well as optionally removable memory (e.g., SD-card), power sources, and audio-video outputs.

In certain embodiments, client device 320 includes additional components such as camera 430 and location module 440. Location module 440 determines the location of client device 320, using, for example, a global positioning satellite signal, cellular tower triangulation, or other methods. Location module 440 may be used by client application 400 to obtain location data and add the location data to metadata about a content item.

Client devices 320 maintain various types of components and modules for operating the client device and accessing content management system 300. The software modules include operating system 450 and optionally a collaborative content item editor 470. Collaborative content item editor 470 is configured for creating, viewing and modifying collaborative content items such as text documents, code files, mixed media files (e.g., text and graphics), presentations or the like. Operating system 450 on each device provides a local file management system and executes the various software modules such as content management system client application 700 and collaborative content item editor 470. A contact directory 490 stores information on the user's contacts, such as name, telephone numbers, company, email addresses, physical address, website URLs, and the like.

Client devices 320 access content management system 300 and collaborative content management system 330 in a variety of ways. Client device 320 may access these systems through a native application or software module, such as content management system client application 400. Client device 320 may also access content management system 300 through web browser 460. As an alternative, the client application 400 may integrate access to content management system 300 with the local file management system provided by operating system 450. When access to content management system 300 is integrated in the local file management system, a file organization scheme maintained at content management system is represented as a local file structure by operating system 450 in conjunction with client application 400.

Client application 400 manages access to content management system 300 and collaborative content management system 330. Client application 400 includes user interface module 402 that generates an interface to the content accessed by client application 400 and is one means for performing this function. The generated interface is provided to the user by display 410. Client application 400 may store content accessed from a content storage at content management system 300 in local content 404. While represented here as within client application 400, local content 404 may be stored with other data for client device 320 in non-volatile storage. When local content 404 is stored this way, the content is available to the user and other applications or modules, such as collaborative content item editor 470, when client application 400 is not in communication with content management system 300 or collaborative content item management system 330. Content access module 406 manages updates to local content 404 and communicates with content management system 300 to synchronize content modified by client device 320 with content maintained on content management system 300, and is one means for performing this function. Client application 400 may take various forms, such as a stand-alone application, an application plug-in, or a browser extension.

Content Management System

Figure 5:
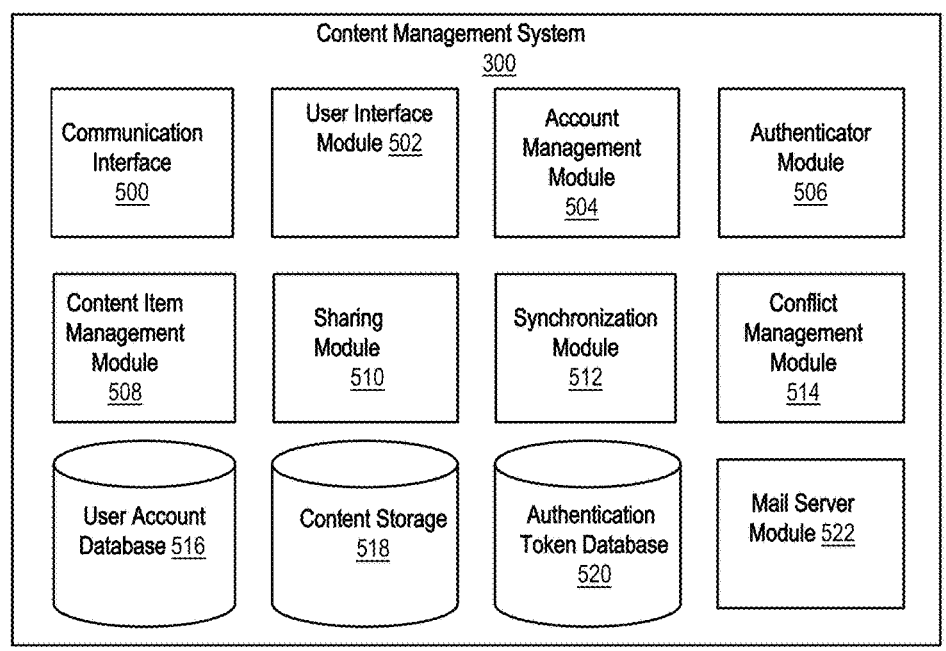
FIG. 5 illustrates a content management system.

FIG. 5 shows a block diagram of the content management system 300 according to some embodiments. To facilitate the various content management services, a user can create an account with content management system 300. The account information can be maintained in user account database 516, and is one means for performing this function. User account database 516 can store profile information for registered users. In some cases, the only personal information in the user profile is a username and/or email address. However, content management system 300 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on corresponding identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 516 can also include account management information, such as account type, e.g., free or paid; usage information for each user, e.g., file usage history; maximum storage space authorized; storage space used; content storage locations; security settings; personal configuration settings; content sharing data; etc. Account management module 504 can be configured to update and/or obtain user account details in user account database 516. Account management module 504 can be configured to interact with any number of other modules in content management system 300.

An account can be used to store content items from one or more client devices associated with the account. Content items can be shared with multiple users and/or user accounts. In some embodiments, sharing a content item can include associating, using sharing module 810, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some embodiments, shared content items can be accessible to a recipient user without requiring authentication into a user account. This can include sharing module 510 providing access to a content item through activation of a link associated with the content item or providing access through a globally accessible shared folder.

The content can be stored in content storage 518, which is one means for performing this function. Content storage 518 can be a storage device, multiple storage devices, or a server. Alternatively, content storage 518 can be a cloud storage provider or network storage accessible via one or more communications networks. In one configuration, content management system 300 stores the content items in the same organizational structure as they appear on the client device. However, content management system 300 can store the content items in its own order, arrangement, or hierarchy.

Content storage 518 can also store metadata describing content items, content item types, and the relationship of content items to various accounts, folders, or groups. The metadata for a content item can be stored as part of the content item or can be stored separately. In one configuration, each content item stored in content storage 518 can be assigned a system-wide unique identifier.

Content storage 518 can decrease the amount of storage space required by identifying duplicate files or duplicate segments of files. Instead of storing multiple copies of an identical content item, content storage 518 can store a single copy and then use a pointer or other mechanism to link the duplicates to the single copy. Similarly, content storage 518 stores files using a file version control mechanism that tracks changes to files, different versions of files (such as a diverging version tree), and a change history. The change history can include a set of changes that, when applied to the original file version, produces the changed file version.

Content management system 300 automatically synchronizes content from one or more client devices, using synchronization module 512, which is one means for performing this function. The synchronization is platform agnostic. That is, the content is synchronized across multiple client devices 320 of varying type, capabilities, operating systems, etc. For example, client application 400 synchronizes, via synchronization module 512 at content management system 300, content in client device 320's file system with the content in an associated user account on system 300. Client application 400 synchronizes any changes to content in a designated folder and its sub-folders with the synchronization module 512. Such changes include new, deleted, modified, copied, or moved files or folders. Synchronization module 512 also provides any changes to content associated with client device 320 to client application 400. This synchronizes the local content at client device 320 with the content items at content management system 300.

Conflict management module 514 determines whether there are any discrepancies between versions of a content item located at different client devices 320. For example, when a content item is modified at one client device and a second client device, differing versions of the content item may exist at each client device. Synchronization module 512 determines such versioning conflicts, for example by identifying the modification time of the content item modifications. Conflict management module 514 resolves the conflict between versions by any suitable means, such as by merging the versions, or by notifying the client device of the later-submitted version.

A user can also view or manipulate content via a web interface generated by user interface module 502. For example, the user can navigate in web browser 460 to a web address provided by content management system 300. Changes or updates to content in content storage 518 made through the web interface, such as uploading a new version of a file, are synchronized back to other client devices 320 associated with the user's account. Multiple client devices 320 may be associated with a single account and files in the account are synchronized between each of the multiple client devices 320.

Content management system 300 includes communications interface 500 for interfacing with various client devices 320, and with other content and/or service providers via an Application Programming Interface (API), which is one means for performing this function. Certain software applications access content storage 518 via an API on behalf of a user. For example, a software package, such as an app on a smartphone or tablet computing device, can programmatically make calls directly to content management system 300, when a user provides credentials, to read, write, create, delete, share, or otherwise manipulate content. Similarly, the API can allow users to access all or part of content storage 518 through a web site.

Content management system 300 can also include authenticator module 506, which verifies user credentials, security tokens, API calls, specific client devices, etc., to determine whether access to requested content items is authorized, and is one means for performing this function. Authenticator module 506 can generate one-time use authentication tokens for a user account. Authenticator module 506 assigns an expiration period or date to each authentication token. In addition to sending the authentication tokens to requesting client devices, authenticator module 506 can store generated authentication tokens in authentication token database 520. After receiving a request to validate an authentication token, authenticator module 506 checks authentication token database 520 for a matching authentication token assigned to the user. Once the authenticator module 506 identifies a matching authentication token, authenticator module 506 determines if the matching authentication token is still valid. For example, authenticator module 506 verifies that the authentication token has not expired or was not marked as used or invalid. After validating an authentication token, authenticator module 506 may invalidate the matching authentication token, such as a single-use token. For example, authenticator module 506 can mark the matching authentication token as used or invalid, or delete the matching authentication token from authentication token database 520.

In some embodiments, content management system 300 includes a content management module 508 for maintaining a content directory that identifies the location of each content item in content storage 518, and allows client applications to request access to content items in the storage 518, and which is one means for performing this function. A content entry in the content directory can also include a content pointer that identifies the location of the content item in content storage 518. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

Collaborative Content Management System

Figure 6:
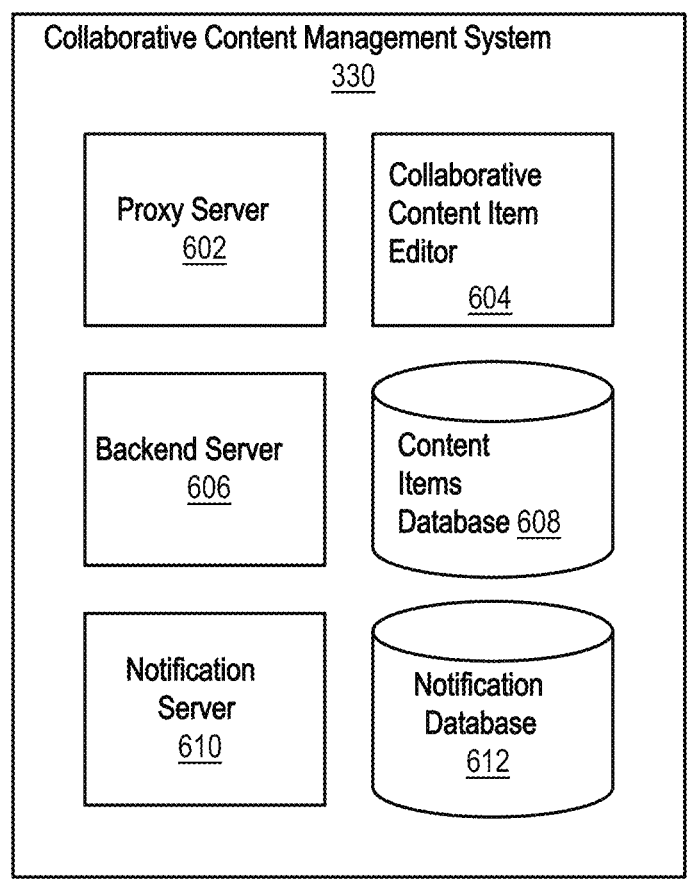
FIG. 6 illustrates a collaborative content management system.

FIG. 6 shows a block diagram of the collaborative content management system 330, according to one embodiment. Collaborative content items can be files that users can create and edit using a collaborative content items editor 460 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 320, using sharing 510 and synchronization 512 modules of content management system 300. Users operate client devices 320 to create and edit collaborative content items, and to share collaborative content items with other users of client devices 320. Changes to a collaborative content item by one client device 320 are propagated to other client devices 320 of users associated with that collaborative content item.

In the embodiment of FIG. 3, collaborative content management system 330 is shown as separate from content management system 300 and can communicate with it to obtain its services. In other embodiments, collaborative content management system 330 is a subsystem of the component of content management system 300 that provides sharing and collaborative services for various types of content items. User account database 516 and authentication token database 520 from content management system 300 are used for accessing collaborative content management system 330 described herein.

Collaborative content management system 330 can include various servers for managing access and edits to collaborative content items and for managing notifications about certain changes made to collaborative content items. Collaborative content management system 330 can include proxy server 602, collaborative content item editor 604, backend server 606, and notification server 610. Proxy server 602 handles requests from client applications 400 and passes those requests to the collaborative content item editor 604. Collaborative content item editor 604 manages application level requests for client applications 400 for editing and creating collaborative content items, and selectively interacts with backend servers 606 for processing lower level processing tasks on collaborative content items, and interfacing with collaborative content items database 608 as needed. Content items database 608 contains a plurality of database objects representing collaborative content items, comment threads, and comments. Notification server 610 detects actions performed on collaborative content items that trigger notifications, creates notifications in notification database 612, and sends notifications to client devices.

Client application 400 sends a request relating to a collaborative content item to proxy server 602. Generally, a request indicates the userID ("UID") of the user, and the collaborativeContentItemID ("NID") of the collaborative content item, and additional contextual information as appropriate, such as the text of the collaborative content item. When proxy server 602 receives the request, the proxy server 602 passes the request to the collaborative content item editor 604. Proxy server 602 also returns a reference to the identified collaborative content items server 604 to client application 400, so the client application can directly communicate with the collaborative content item editor 604 for future requests. In an alternative embodiment, client application 400 initially communicates directly with a specific collaborative content item 604 assigned to the userID.

When collaborative content item editor 604 receives a request, it determines whether the request can be executed directly or by a backend server 606. When the request adds, edits, or otherwise modifies a collaborative content item the request is handled by the collaborative content item editor 604. If the request is directed to a database or index inquiry, the request is executed by a backend server 606. For example, a request from client device 320 to view a collaborative content item or obtain a list of collaborative content items responsive to a search term does not modify collaborative content items and is processed by backend server 606.

Content management system 300 and collaborative content management system 330 may be implemented using a single computer, or a network of computers, including cloud-based computer implementations. The operations of content management system 300 and collaborative content management system 330 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 300 and collaborative content management system 330 are sufficiently complex as to require implementation on a computer system, and cannot be performed in the human mind simply by mental steps.

Basic Implementing Mechanisms

Figure 7:
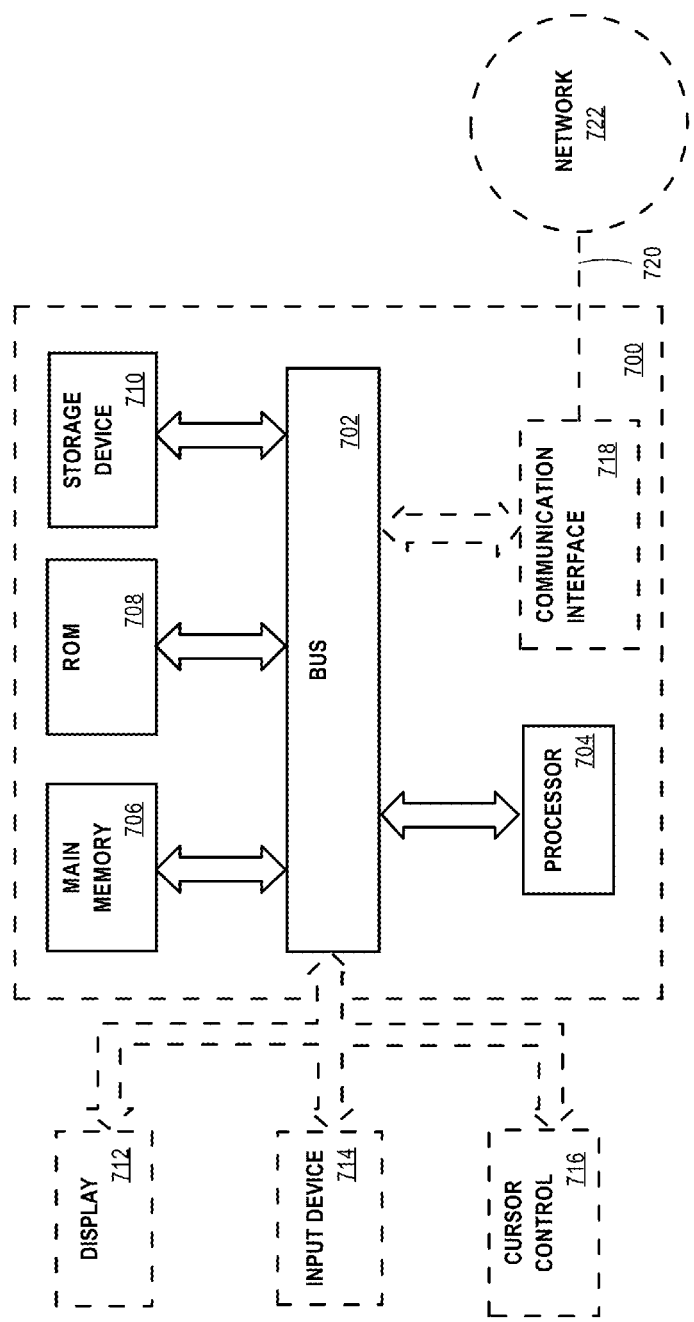
FIG. 7 illustrates an example of a basic hardware machine that may be used utilized to implement the present invention.

The present invention may be implemented using a computing system comprising one or more processors and memory. The one or more processors and memory may be provided by one or more hardware machines. FIG. 7 illustrates an example of a basic hardware machine 700 that may be used to implement the present invention, according to an embodiment of the present invention. Hardware machine 700 and its hardware components, including their connections, relationships, and functions, is meant to be exemplary only, and not meant to limit implementations of the present invention. Other hardware machines suitable for implementing the present invention may have different components, including components with different connections, relationships, and functions.

Hardware machine 700 includes a bus 702 or other communication mechanism for addressing a main memory 706 and for transferring data between and among the various components of hardware machine 700.

Hardware machine 700 also includes a processor 704 coupled with bus 702 for processing information. Processor 704 may be a general-purpose microprocessor, a system on a chip (SoC), or another hardware processor.

Main memory 706, such as a random-access memory (RAM) or other dynamic storage device, is coupled to bus 702 for storing information and software instructions to be executed by processor 704. Main memory 706 also may be used for storing temporary variables or other intermediate information during execution of software instructions to be executed by processor 704.

Software instructions, when stored in storage media accessible to processor 704, render hardware machine 700 into a special-purpose computing machine that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a machine to perform specific operations, and including, but not limited to, application software, desktop applications, scripts, binaries, operating systems, device drivers, boot loaders, shells, utilities, system software, JAVASCRIPT, web pages, web applications, mobile applications, plugins, embedded software, microcode, compilers, debuggers, interpreters, virtual machines, linkers, and text editors.

Hardware machine 700 includes a read-only memory (ROM) 708 or other static storage device coupled to bus 702 for storing static information and software instructions for a processor 704.

A mass storage device 710 is coupled to bus 702 for persistently storing information and software instructions on fixed or removable media, such as magnetic, optical, solid-state, magnetic-optical, flash memory, or any other available mass storage technology. The mass storage may be shared on a network, or it may be dedicated mass storage. Mass storage device 710 may store a body of program and data for directing operation of hardware machine 700, including an operating system, user application programs, driver, and other support files, as well as other data files of all sorts.

Hardware machine 700 may be coupled via bus 702 to a display 712, such as a liquid crystal display (LCD) or other electronic visual display, for displaying information to a computer user. A touch sensitive surface incorporating touch detection technology (e.g., resistive, capacitive, etc.) may be incorporated with display 712 to form a touch sensitive display for communicating touch gesture (e.g., finger or stylus) input to processor 704.

An input device 714 may be coupled to bus 702 for communicating information and command selections to processor 704. Input device 714 may include alphanumeric and other keys. Input device 714 may include one or more physical buttons or switches such as, for example, a power (on/off) button, a "home" button, volume control buttons, or the like.

A cursor control 716, such as a mouse, a trackball, touchpad, touch-sensitive surface, or cursor direction keys for communicating direction information and command selections to processor 704 and for controlling cursor movement on display 712, may be coupled to bus 702. Cursor control 716 may have two degrees of freedom in two axes, a first axis (e.g., x) and a second axis (e.g., y), that allows the device to specify positions in a plane. Cursor control 716 may have more degrees of freedom with a third axis (e.g., z). For example, cursor control 716 may have three translational degrees of freedom (e.g., surge, heave, and sway) in three perpendicular axes, that allows the device to specify position in the three axes. Cursor control 716 may have three rotational degrees of freedom (e.g., pitch, yaw, roll) about three perpendicular axes, that allows the device to specify an orientation about the three axes.

While one or more of display 712, input device 714, and cursor control 716 may be external components (i.e., peripheral devices) of hardware machine 700, some or all of display 712, input device 714, and cursor control 716 may be integrated as part of the form factor of hardware machine 700.

A function or operation of the present invention may be performed by hardware machine 700 in response to processor 704 executing one or more programs of software instructions contained in main memory 706. Such software instructions may be read into main memory 706 from another storage medium, such as a storage device 710. Execution of the software instructions contained in main memory 706 cause processor 704 to perform the function or operation.

While a function or operation of the present invention may be implemented entirely with software instructions, hard-wired or programmable circuitry of hardware machine 700 (e.g., an ASIC, a FPGA, or the like) may be used in place of or in combination with software instructions to perform the function or operation.

The term "storage media" as used herein refers to any non-transitory media that store data and/or software instructions that cause a hardware machine to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more software instructions to processor 704 for execution. For example, the software instructions may initially be carried on a magnetic disk or solid-state drive of a remote computer. The remote computer can load the software instructions into its dynamic memory and send the software instructions over a data communications network. Hardware machine 700 can receive the data over the data communications network and appropriate circuitry can place the data on bus 702. Bus 702 carries the data to main memory 706, from which processor 704 retrieves and executes the software instructions. The software instructions received by main memory 706 may optionally be stored on storage device 710 either before or after execution by processor 704.

Hardware machine 700 may include a communication interface 718 coupled to bus 702. Communication interface 718 provides a two-way data communication coupling to a wired or wireless network link 720 that connects hardware machine 700 to a data communications network 722 (e.g., a local area network (LAN), a wide area network (WAN), a wireless local area network (WLAN), a metropolitan area network (MAN), a storage area network (SAN), etc.). Network link 720 provides data communication through network 722 to one or more other networked devices.

Communication interface 718 may send and receive electrical, electromagnetic, or optical signals that carry digital data streams representing various types of information. For example, communication interface 718 may be implemented by a wired network interface card, a wireless network interface card with an integrated radio antenna, or a modem.

Network link 720 may provide a connection through network 722 to a host computer or to data equipment operated by an Internet Service Provider (ISP). The ISP may in turn provide data communication services through the world-wide packet data communication network now commonly referred to as the "Internet". Network 722 and Internet use electrical, electromagnetic or optical signals that carry digital data streams. The signals through the various networks and the signals on network link 720 and through communication interface 718, which carry the digital data to and from hardware machine 700, are example forms of transmission media.

Hardware machine 700 can send messages and receive data, including program code, through network 722, network link 720, and communication interface 718. In the Internet example, a server might transmit a requested code for an application program through Internet, ISP, and network 722 and communication interface 718.

The received code may be executed by processor 704 as it is received, and/or stored in storage device 710, or other non-volatile storage for later execution.

Figure 8:
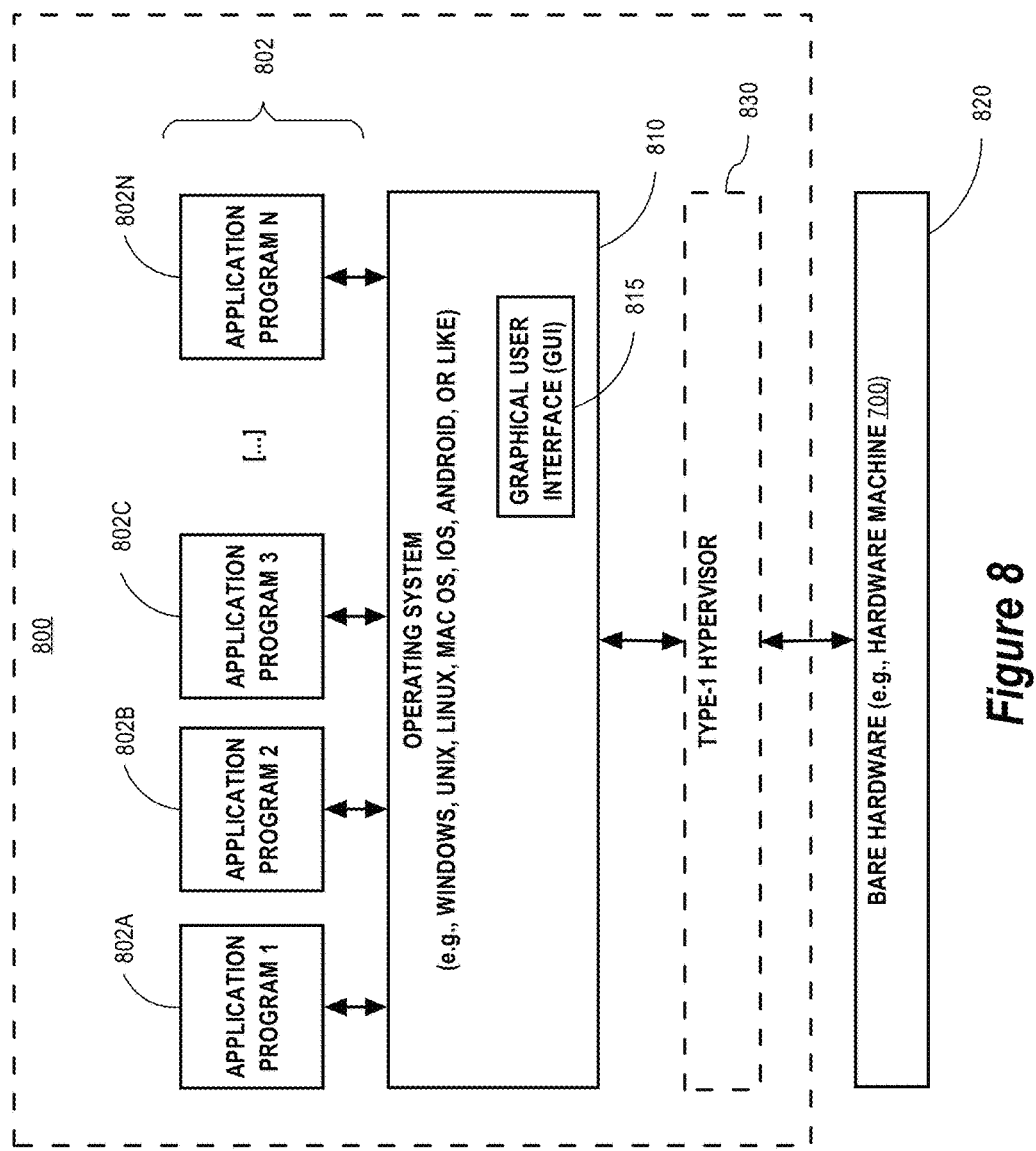
FIG. 8 illustrates an example of a basic software system for controlling the operation of a basic hardware machine.

FIG. 8 illustrates basic software system 800 that may be employed for controlling the operation of hardware machine 700 of FIG. 7, according to an embodiment of the present invention. Software system 800 and its software components, including their connections, relationships, and functions, is meant to be exemplary only, and not meant to limit implementations of the present invention. Other software systems suitable for implementing the present invention may have different components, including components with different connections, relationships, and functions.

Software system 800 is provided for directing the operation of hardware machine 700. Software system 800 may be stored in system memory (RAM) 706 and on fixed storage (e.g., hard disk or flash memory) 710.

Software system 800 includes a kernel or operating system (OS) 810. OS 810 manages low-level aspects of computer operation, including managing execution of processes, memory allocation, file input and output (I/O), and device I/O.

Software system 800 includes one or more application programs, represented as 802A, 802B, 802C . . . 802N, that may be "loaded" (e.g., transferred from fixed storage 710 into memory 706) for execution by hardware machine 700. The applications or other software intended for use on hardware machine 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. GUI 815 also serves to display the results of operation from the OS 810 and applications 802, whereupon the user may supply additional inputs or terminate the session (e.g., log off).

Software system 800 can execute directly on bare hardware 820 (e.g., machine 700). Alternatively, a "Type-1" hypervisor 830 may be interposed between the bare hardware 820 and OS 810 as part of software system 800. Hypervisor 830 acts as a software "cushion" or virtualization layer between the OS 810 and bare hardware 820. Hypervisor 830 instantiates and runs one or more virtual machine instances. Each virtual machine instance comprises a "guest" operating system, such as OS 810, and one or more applications, such as applications 802, designed to execute on the guest operating system. Hypervisor 830 presents the guest operating systems with a virtual operating platform and manages the execution of the guest operating systems.

Hypervisor 830 may allow a guest operating system to run as if it is running on bare hardware 820 directly. In this case, the guest operating system as configured to execute on bare hardware 820 can also execute on hypervisor 830. In other words, hypervisor 830 may provide full hardware virtualization to the guest operating system. Alternatively, hypervisor 830 may provide para-virtualization to the guest operating system. In this case, the guest operating system is "aware" that it executes on hypervisor 830 and is specially designed or configured to execute on hypervisor 830.

EXTENSIONS AND ALTERNATIVES

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

The invention claimed is:

1. A method performed by a computing system comprising one or more processors and memory, the method comprising:
   determining a collaboration score for each collaborator in a set of collaborators with a particular user account;
   wherein the determining the collaboration score for each collaborator in the set of collaborators is based on one or more collaboration events, in a content management system, between the particular user account and the each collaborator;
   selecting a set of top collaborators from the set of collaborators, the selecting the set of top collaborators based on the collaboration score for each collaborator in the set of top collaborators;
   wherein one or more collaborators in the set of collaborators are not selected for inclusion in the set of top collaborators;
   after the selecting the set of top collaborators, identifying a particular content item that one or more top collaborators, in the set of top collaborators, are currently interacting with;
   wherein the identifying the particular content item that the one or more top collaborators are currently interacting with is based on one or more interaction events in the content management system, the one or more interaction events caused by one or more current interactions with the particular content item by the one or more top collaborators;
   wherein each interaction event of the one or more interaction events is associated, in a data structure maintained in the memory for the particular user account, with a time indicating when a top collaborator of the one or more top collaborators interacted with the particular content item, the time being after the selecting the set of top collaborators and after a start time of a sliding time window, wherein the one or more interaction events are within the sliding time window and are considered current interaction events;

computing a trend score for the particular content item based, at least in part, on the collaboration scores of the one or more top collaborators currently interacting with the particular content item;

based at least in part on the trend score, selecting the particular content item for inclusion in a currently trending content items list; and causing a representation of the currently trending content items list to be presented in a graphical user interface to a user of the particular user account.

2. The method of claim 1, wherein a particular collaboration event of the one or more collaboration events between the particular user account and a particular collaborator in the set of collaborators is based on at least one of:

the particular user account sharing content with the particular collaborator;

the particular collaborator sharing content with the particular user account; or another user account sharing content with both the particular user account and the particular collaborator.

3. The method of claim 1, wherein the collaboration score for a particular collaborator in the set of collaborators is computed based on:

weighting (a) more heavily than (b), wherein (a) is an instance of the particular collaborator sharing content with the particular user account and (b) is an instance of another user account sharing content with both the particular user account and the particular collaborator.

4. The method of claim 1, wherein a particular collaboration event of the one or more collaboration events between the particular user account and a particular collaborator in the set of collaborators is based on at least one of:

the particular user account viewing a same content as the particular collaborator;

the particular user account editing a same content as the particular collaborator;

the particular user account commenting on a same content as the particular collaborator; or the particular user account favorite-ing a same content as the particular collaborator.

5. The method of claim 1, wherein the collaboration score for a particular collaborator in the set of collaborators is computed based, at least in part, on:

applying a first weight to an instance of the particular user account viewing a same content as the particular collaborator;

applying a second weight, different from the first weight, to an instance of the particular user account editing a same content as the particular collaborator; and applying a third weight, different from the first and second weights, to an instance of the particular user account commenting on a same content as the particular collaborator.

6. The method of claim 1, wherein the one or more interaction events reflect, at least in part, a top collaborator in the set of top collaborators that is currently viewing the particular content item, currently editing the particular content item, or currently commenting on the particular content item.

7. The method of claim 1, wherein the one or more interaction events reflect at least in part, top collaborators in the set of top collaborators that are currently viewing the particular content item or currently editing the particular content item; and wherein the computing the trend score for the particular content item is based on:

a first weight applied to one or more top collaborators in the set of top collaborators that are currently viewing the particular content item, and a second weight, different from the first weight, applied to one or more top collaborators in the set of top collaborators that are currently editing the particular content item.

8. The method of claim 1, wherein the currently trending content items list includes a plurality of content items, each of the plurality of content items having a computed trend score; and wherein the plurality of content items is ranked in the currently trending content items list based, at least in part, on the trend score computed for each content item in the plurality of content items.

9. The method of claim 1, wherein the selecting the particular content item for inclusion in the currently trending content items list is based on the trend score being above a threshold trend score.

10. The method of claim 1, wherein the selecting the set of top collaborators comprises selecting a particular collaborator in the set of collaborators for inclusion in the set of top collaborators based on the collaboration score computed for the particular collaborator is being above a threshold collaboration score.

11. One or more non-transitory computer-readable media storing one or more programs for execution by a computing system comprising one or more processors and memory, the one or more programs comprising instructions configured for:

determining a collaboration score for each collaborator in a set of collaborators with a particular user account;

wherein the determining the collaboration score for each collaborator in the set of collaborators is based on one or more collaboration events, in a content management system, between the particular user account and the each collaborator;

selecting a set of top collaborators from the set of collaborators, the selecting the set of top collaborators based on the collaboration score for each collaborator in the set of top collaborators;

wherein one or more collaborators in the set of collaborators are not selected for inclusion in the set of top collaborators;

after the selecting the set of top collaborators, identifying a particular content item that one or more top collaborators, in the set of top collaborators, are currently interacting with;

wherein the identifying the particular content item that the one or more top collaborators are currently interacting with is based on one or more interaction events in the content management system, the one or more interaction events caused by one or more current interactions with the particular content item by the one or more top collaborators;

wherein each interaction event of the one or more interaction events is associated, in a data structure maintained in the memory for the particular user account, with a time indicating when a top collaborator of the one or more top collaborators interacted with the particular content item, the time being after the selecting the set of top collaborators and after a start time of a sliding time window, wherein the one or more interaction events are within the sliding time window and are considered current interaction events;

computing a trend score for the particular content item based, at least in part, on the collaboration scores of the one or more top collaborators currently interacting with the particular content item;

based at least in part on the trend score, selecting the particular content item for inclusion in a currently trending content items list; and causing a representation of the currently trending content items list to be presented in a graphical user interface to a user of the particular user account.

12. The one or more non-transitory computer-readable media of claim 11, wherein a particular collaboration event of the one or more collaboration events between the particular user account and a particular collaborator in the set of collaborators is based on at least one of:
the particular user account sharing content with the particular collaborator;
the particular collaborator sharing content with the particular user account; or
another user account sharing content with both the particular user account and the particular collaborator.

13. The one or more non-transitory computer-readable media of claim 11, wherein the collaboration score for a particular collaborator in the set of collaborators is computed based on:
weighting (a) more heavily than (b), wherein (a) is an instance of the particular collaborator sharing content with the particular user account and (b) is an instance of another user account sharing content with both the particular user account and the particular collaborator.

14. The one or more non-transitory computer-readable media of claim 11, wherein a particular collaboration event of the one or more collaboration events between the particular user account and a particular collaborator in the set of collaborators is based on at least one of:
the particular user account viewing a same content as the particular collaborator;
the particular user account editing a same content as the particular collaborator;
the particular user account commenting on a same content as the particular collaborator; or
the particular user account favorite-ing a same content as the particular collaborator.

15. The one or more non-transitory computer-readable media of claim 11, wherein the collaboration score for a particular collaborator in the set of collaborators is computed based, at least in part, on:
applying a first weight to an instance of the particular user account viewing a same content as the particular collaborator;
applying a second weight, different from the first weight, to an instance of the particular user account editing a same content as the particular collaborator; and
applying a third weight, different from the first and second weights, to an instance of the particular user account commenting on a same content as the particular collaborator.

16. A computing system comprising:
one or more processors;
memory;
one or more programs stored in the memory and configured for execution by the one or more processors, the one or more programs comprising instructions configured for:
determining a collaboration score for each collaborator in a set of collaborators with a particular user account;
wherein the determining the collaboration score for each collaborator in the set of collaborators is based on one or more collaboration events, in a content management system, between the particular user account and the each collaborator;
selecting a set of top collaborators from the set of collaborators, the selecting the set of top collaborators based on the collaboration score for each collaborator in the set of top collaborators;
wherein one or more collaborators in the set of collaborators are not selected for inclusion in the set of top collaborators;
after the selecting the set of top collaborators, identifying a particular content item that one or more top collaborators, in the set of top collaborators, are currently interacting with;
wherein the identifying the particular content item that the one or more top collaborators are currently interacting with is based on one or more interaction events in the content management system, the one or more interaction events caused by one or more current interactions with the particular content item by the one or more top collaborators;
wherein each interaction event of the one or more interaction events is associated, in a data structure maintained in the memory for the particular user account, with a time indicating when a top collaborator of the one or more top collaborators interacted with the particular content item, the time being after the selecting the set of top collaborators and after a start time of a sliding time window, wherein the one or more interaction events are within the sliding time window and are considered current interaction events;
computing a trend score for the particular content item based, at least in part, on the collaboration scores of the one or more top collaborators currently interacting with the particular content item;
based at least in part on the trend score, selecting the particular content item for inclusion in a currently trending content items list; and
causing a representation of the currently trending content items list to be presented in a graphical user interface to a user of the particular user account.

17. The computing system of claim 16, wherein a particular collaboration event of the one or more collaboration events between the particular user account and a particular collaborator in the set of collaborators is based on at least one of:
the particular user account sharing content with the particular collaborator;
the particular collaborator sharing content with the particular user account; or
another user account sharing content with both the particular user account and the particular collaborator.

18. The computing system of claim 16, wherein the collaboration score for a particular collaborator in the set of collaborators is computed based on: weighting (a) more heavily than (b), wherein (a) is an instance of the particular collaborator sharing content with the particular user account and (b) is an instance of another user account sharing content with both the particular user account and the particular collaborator.

19. The computing system of claim 16, wherein a particular collaboration event of the one or more collaboration events between the particular user account and a particular collaborator in the set of collaborators is based on at least one of:

the particular user account viewing a same content as the particular collaborator;

the particular user account editing a same content as the particular collaborator;

the particular user account commenting on a same content as the particular collaborator; or the particular user account favorite-ing a same content as the particular collaborator.

20. The computing system of claim 16, wherein the collaboration score for a particular collaborator in the set of collaborators is computed based, at least in part, on:

applying a first weight to an instance of the particular user account viewing a same content as the particular collaborator;

applying a second weight, different from the first weight, to an instance of the particular user account editing a same content as the particular collaborator; and applying a third weight, different from the first and second weights, to an instance of the particular user account commenting on a same content as the particular collaborator.

* * * * *